(12) United States Patent
Eipper et al.

(10) Patent No.: US 6,918,628 B2
(45) Date of Patent: Jul. 19, 2005

(54) REAR ROOF FRAME FOR MOTOR VEHICLES

(75) Inventors: Konrad Eipper, Rottenburg (DE);
Heinz Koslowski, Gerlingen (DE);
Thomas Lohse, Mechtersen (DE);
Thomas Sailer, Metzingen (DE);
Matthias Schroeder, Gruenendeich (DE); Roland Wendler, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/469,523
(22) PCT Filed: Feb. 7, 2002
(86) PCT No.: PCT/EP02/01267
§ 371 (c)(1),
(2), (4) Date: Feb. 17, 2004
(87) PCT Pub. No.: WO02/070325
PCT Pub. Date: Sep. 12, 2002

(65) Prior Publication Data
US 2004/0135401 A1 Jul. 15, 2004

(30) Foreign Application Priority Data
Mar. 2, 2001 (DE) .......................................... 101 10 055

(51) Int. Cl.⁷ ................................................ B60J 7/00
(52) U.S. Cl. ............................ 296/187.11; 296/193.08; 296/202; 296/203.04; 296/146.9; 296/210
(58) Field of Search ....................... 296/187.11, 193.08, 296/202, 203.04, 205, 50, 56, 146.1, 146.8, 146.9, 146.11, 210

(56) References Cited

U.S. PATENT DOCUMENTS

| 6,595,580 | B2 | * | 7/2003 | Eberle et al. | 296/203.04 |
| 6,824,196 | B2 | * | 11/2004 | Neidlein | 296/146.11 |
| 2004/0124671 | A1 | * | 7/2004 | Roehl | 296/203.04 |

FOREIGN PATENT DOCUMENTS

| DE | 10001989 A1 | 7/2001 |
| DE | 10014367 A1 | 9/2001 |
| DE | 10034141 A1 | 1/2002 |
| WO | WO 99/11504 | 3/1999 |

* cited by examiner

Primary Examiner—Jason Morrow
(74) Attorney, Agent, or Firm—Crowell & Moring LLP

(57) ABSTRACT

A rear roof frame of a motor vehicle has a tailgate which is fastened to the roof frame and includes an upper shell and a lower shell which is fitted to the latter. For the design of a rear roof frame, which, in spite of the shell-type construction, provides, in a simple manner and lightweight construction, sufficient torsional and flexural stiffness in order to withstand high mechanical stresses, it is proposed to arrange within the shell structure a hollow profile which leads in each case from the transition region to the lateral roof frame and parallel to the longitudinal extent of the structure, and emerges, at least at the end facing away from the lateral roof frame, in a knee which kinks in the front-end direction of the vehicle. The end of the rear roof frame forms a tubular hollow profile of the lateral roof frame, which is connected to the hollow profile of the rear roof frame.

21 Claims, 1 Drawing Sheet

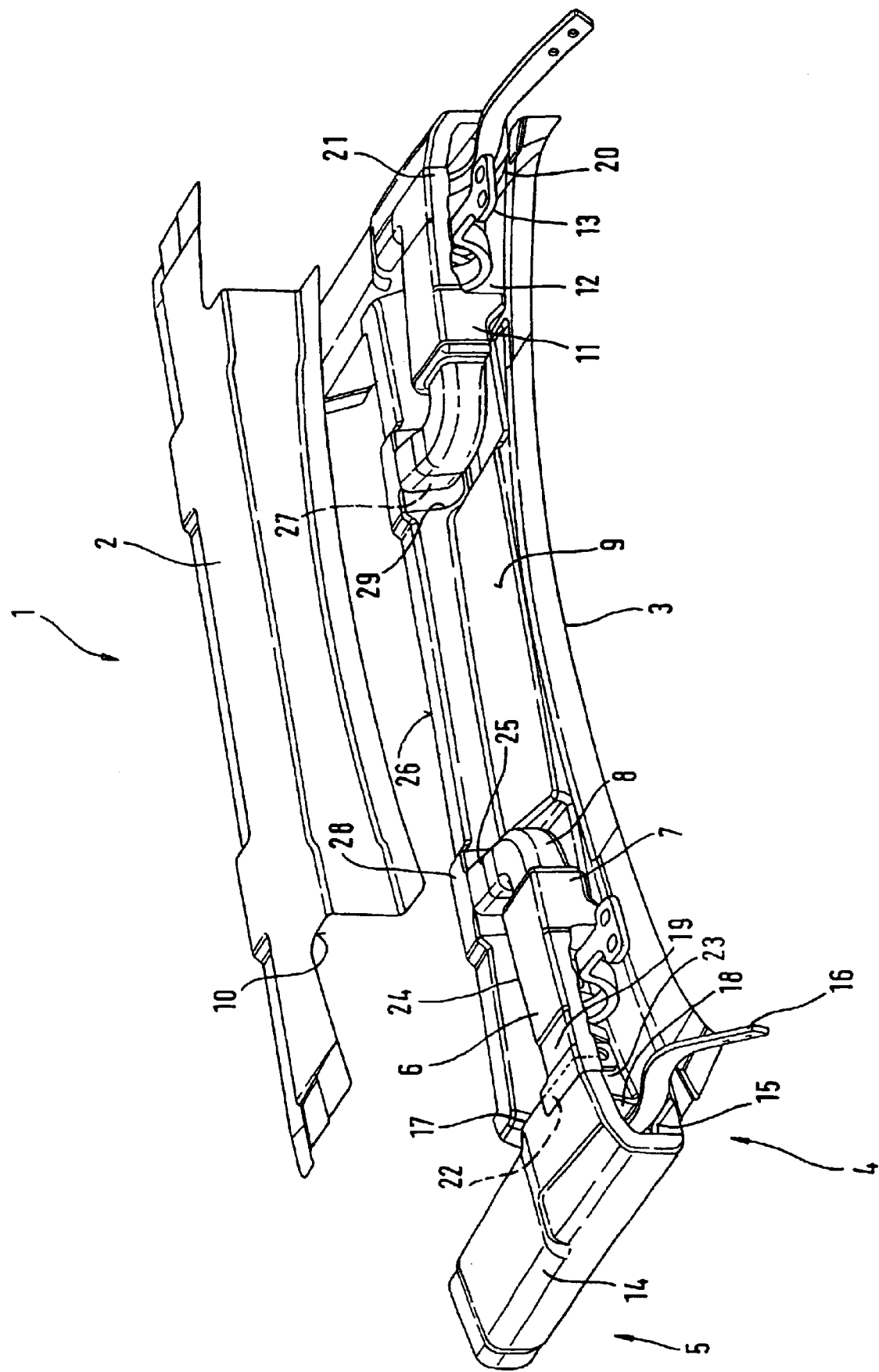

REAR ROOF FRAME FOR MOTOR VEHICLES

BACKGROUND AND SUMMARY OF THE INVENTION

This invention relates to a rear roof frame of motor vehicles.

In conventional mass-produced motor vehicles, in particular in "station wagons", the rear roof frame comprises a multiplicity of individual sheet-metal pressed parts which are joined to form an inner shell and an outer shell which are joined, in particular welded, to form a hollow profile, with a hollow space being formed. The supporting device for the tailgate, which is fastened to the roof frame and can be pivoted upwards, is formed by hinges which are each fastened at one end to the rear roof frame. In addition, the tailgate is also supported by gas-filled springs which are coupled, on the one hand, to the rear post of the bodywork and, on the other hand, which are directly coupled to the tailgate. In order to ensure that the bodywork is leak proof, particularly in the corner region in the transition of the rear roof frame into the lateral roof frame which is open to the rear in the unfinished state, the shells have to be sealed to the outside in the flange regions in a complex and careful manner. This frequently requires environmentally incompatible sealants. Furthermore, the multipart nature and the welding connections which are affected by distortion give rise to tolerance problems which may also hinder the possibility of providing seal of the connection of the rear roof frame to the lateral roof frame and may have the consequence of the roof frame being complicated to align.

The open design of the rear roof frame in the corner regions toward the lateral roof frame means that the stiffness in the torsional and flexural direction is reduced, which may lead, in the driving mode and when opening the tailgate, to the frame becoming distorted, or else, after the motor vehicle has been used for a relatively long time, to damage due to sink marks on the frame. In order to counteract this, a multiplicity of additionally fitted stiffening plates may be fitted in the corner regions of the rear roof frame so as to ensure long-term operation of the vehicle, which results in an increased outlay on assembly and to an increased weight.

The invention is based on the object of providing a rear roof frame of a motor vehicle having a tailgate which is fastened to the roof frame, the roof frame, in spite of a shell-type construction, providing, in a simple manner and lightweight construction, sufficient torsional and flexural stiffness in order to withstand high mechanical stresses.

Owing to the invention, a complicated shell structure having stiffening plates is rendered superfluous, since the shell-type construction is limited just to two shells, an upper shell and a lower shell. Owing to the fact that, in the transition region of the rear roof frame to the lateral roof frame in the shell structure, hollow profiles having a knee-shaped section are arranged on both sides and are fastened to the structure, the rear roof frame obtains exceptional flexural and torsional stiffness transversely and longitudinally to the direction of the vehicle. The stiffness is particularly concentrated at the point at which the hinge of the tailgate is provided, with the result that, in the roof frame design according to the invention, the frame is not damaged during frequent pivoting actuation of the tailgate and other mechanical stresses of the vehicle during the driving mode which, inter alia, also have an effect on the rear roof frame in the form of distortions. Hollow profiles are simple to produce and are of low weight owing to their high stiffness characteristics in comparison to other conventionally stiffening sheet-metal constructions of shell-type constructions given comparable stiffness values. Owing to the tight linkage of the lateral roof frame to the rear roof frame in the form of a hollow profile which forms the end of the rear frame, an optimum introduction and distribution of force in the entire roof frame is obtained, this linkage making a further substantial contribution to stiffening the rear roof frame. The central part of the rear roof frame, which does not require special stiffening, remains flexurally slack in comparison to the remaining roof frame.

Owing to the fact that the end region of the rear and of the lateral roof frame, which is partially open to the rear in the unfinished state and is therefore weakened in terms of stiffness, is formed by hollow profiles, in particular by a single-piece, circumferentially closed hollow profile in the transition to the lateral roof frame, the weakening is overcompensated in a simple manner, this being of considerable advantage particularly during a side impact and if the motor vehicle overturns, because of the energy-absorbing effect. Welding flanges are no longer absolutely necessary for the production and are no longer of any significance when considering the leakproofness. The absence of gaps and welding flanges means that the hollow profile according to the invention does not allow any sealing problems to occur, it being possible for manufacturing to take place with substantially smaller tolerances than in a multipart shell construction. In view of its very high stiffness, the wall thickness can be reduced with an insignificant reduction in the stiffness, which saves structural space and weight. In an advantageous manner with respect to a space-saving and protected possibility of accommodating it, the hollow profile forms a receiving housing in which the hinge and/or the gas-filled compression spring is/are fitted. The hollow profiles may be designed as a blank, for example as a two-shell structure. As an alternative, extruded profiles or drawn tubes are conceivable. The hollow profiles may likewise be cut from a billet and welded along the longitudinal seam after a subsequent bending or rolling operation.

Furthermore, the multiplicity of parts for producing the rear roof frame and therefore the entire roof frame is reduced, which means that production and installation are not very complicated and that the production costs are reduced.

BRIEF DESCRIPTION OF THE DRAWING

The invention is explained in greater detail below with reference to an exemplary embodiment illustrated in the drawing, in which the FIGURE shows, in a perspective illustration, a rear roof frame according to the invention with a hollow-profile assembly of the lateral roof frame in the end region of the rear roof frame.

DETAILED DESCRIPTION OF THE INVENTION

The FIGURE illustrates a rear roof frame 1 of a motor vehicle having a tailgate which is fastened to the roof frame 1. The rear roof frame 1 comprises an upper shell 2 and a lower shell 3 which is fitted to the latter. The shells 2 and 3 can be joined either nonreleasably, by means of welding, bonding or interlocking, or else releasably by means of connecting elements, such as screws or the like. A hollow profile 6 which leads in each case from the transition region 4 to the lateral roof frame 5 and runs parallel to the longitudinal extent of the structure is arranged within the shell structure. The rectilinear hollow profile 6, which may be manufactured both as a single piece and also as a shell-type construction, is connected by its end 7, which faces away from the lateral roof frame 5, directly to a further, knee-shaped hollow profile 8 which kinks in the front-end direction of the vehicle.

Although it is conceivable for the two hollow profiles 6 and 8 to be connected integrally to each other in a simple manner in terms of manufacturing, the two-part formation which is shown produces better interchangeability of the individual components and greater suitability for specifically adapting it to the structural space. If the single-part variant is selected, the hollow profile 6, 8 can be bent from a rectilinear tube, which is then profiled in advance in shape and diameter and with regard to the cross section in a mold and is subsequently brought by internal high-pressure forming into the final shape with the desired profiled contour and free from tolerances. In this variant, the hollow profile 6 then emerges integrally into the knee 8. The hollow profile 6 and the knee 8 can be fastened releasably or nonreleasably to the upper side 9 of the lower shell 3 and to the lower side 10 of the shell 2 or to just one of the two shells 2, 3. The rearwardly pointing end side 11 of the hollow profile 6 or—in the case of the integral connection to the knee 8—its section which extends along the shell structure (upper shell 3 and lower shell 3) has a horizontally extending, slot-like opening 12 which protrudes through a tailgate hinge 13, which is fastened in the hollow profile 6 by screws to the inside 23 of the rear end side 24 of the profile.

A tubular hollow profile 14 of the lateral roof frame 5, which is connected to the hollow profile 6 of the rear roof frame 1, is formed by the respective end of the rear roof frame 1. The hollow profile 14 may be a part formed by internal high pressure, which means that the sheet-metal constructions which are affected by manufacturing and installation tolerances are indeed superfluous and the high demands for leakproofness which arise right in the transition region 4 are completely met. In a favorable manner in terms of manufacturing, the hollow profile 14, the hollow profile 6 and the knee 8 may be connected integrally, in which case a simple, straight tube forms the tube round, which is first of all bent in a U shape and then pinched and profiled in advance in an internal high-pressure forming mold. The component is then expanded by means of fluidic internal high pressure in accordance with requirements with regard to cross section, shape and contour, after which the opening 12 is cut out in the transition region 4 and an opening 15 is cut out at the rear end of the section forming the hollow profile 14, for example by means of laser contour cutting, for receiving and installing a gas-filled compression spring 16 as supporting device for the tailgate.

However, in the present exemplary embodiment, the hollow profiles 14, 6 and 8 are separate components which are joined to one another. On its side 17 which faces the hollow profile 6, the hollow profile 14 of the lateral roof frame 5 has, in a favorable manner in terms of connecting techniques, a notch 18 in which the hollow profile 6 of the rear roof frame 1 engages by means of its facing end 19, in which case the edges 20 of the notch 18 are encompassed by the hollow profile 6. For this purpose, the hollow profile 6 is turned upon the end side, so that a region 21 in the manner of a welding flange is formed over the entire circumference of the end 19 of the hollow profile. The region, when encompassing the notch edges 20, provides an overlapping zone 22 in which the two hollow profiles 6 and 14 can be welded, preferably spot-welded, in a manner which is easy to handle. For secure sealing, the hollow profiles 6 and 14 are also bonded there, the bonding process taking place after the welding. The adhesive is applied to the hollow profile 14 directly next to the end of the encompassing and already welded hollow profile 6, after which the adhesive which is still liquid is drawn over a wide area into the overlapping zone 22 by means of a capillary effect of the joining gap between the hollow profiles 6 and 14 and can then cure.

The weakening of the hollow profile 14 in respect of the stiffness at this point by means of the notch 18 is more than compensated for by the described, right angled attachment to the hollow profile 6 of the rear roof frame 1. In addition, forces which act from the outside, such as in the case of the side impact, are very readily transferred to the rest of the roof frame by being introduced over a large area into the rear roof frame 1. This results in high impact resistance. As an alternative, the hollow profile 14 may be closed laterally, as a result of which the interior spaces of the hollow profiles 6 and 14 are separated from each other. In this case, the facing end of the hollow profile 6 has to be formed with welding or bonding flanges, so that a secure attachment is ensured. For this purpose, the circumferential surface of the hollow profile 14 can be adapted at the corresponding joining point to the contour of the welding flanges by internal high-pressure forming or can be suitably shaped to make handling of the joining process as favorable as possible.

It can furthermore be gathered from the FIGURE that the knee 8 is fastened by means of its end 25 pointing in the front-end direction of the vehicle to the longitudinal side 26 of the shell structure, which provides a further increase in stiffness for the rear roof frame 1 in the transition region 4 to the lateral roof frame 5. This attachment to the shell structure forms, together with the hollow profile 14, the hollow profile 6 and the knee 8, a type of rectangular stiffness junction with properties of high stiffness in all three-dimensional directions, which, in addition to the eminent mechanical load-bearing capacity, ensures exceptional energy absorption capacities of the rear roof frame in the vehicle crash.

The hollow knee 8 has, at its end 25, an opening 27 which is aligned with an opening in the lower shell 3 of the shell structure on the longitudinal side 26 thereof. The end 25 has a flange 28 which is in the manner of an annular collar, is folded down on the upper side in the front-end direction of the vehicle and is fit into a U-shaped cutout 29 of the lower shell 3, which cutout contains the above mentioned opening, and is fastened there to the lower shell. The intended use of the openings in the lower shell 3 and the opening 27 is that with them and the knee 8 and the hollow profile 6 a cable duct for rear lights, rear heating system, window wiper, central locking system, closing aid etc. is formed in a simple manner with the best possible sealing to the outside and also with good guidance for the cables.

What is claimed is:

1. A rear roof frame of a motor vehicle, having a tailgate which is set into the roof frame, the rear roof frame comprising:
   an upper shell,
   a lower shell which is fitted to the upper shell so as to form a shell structure,
   a hollow profile which leads from a transition region to a lateral roof frame arranged within the shell structure and running parallel to a longitudinal extent of the structure and emerging, at least at an end which faces away from the lateral roof frame, in a knee which kinks in a front-end direction of the vehicle,
   wherein the hollow profile, on its rearwardly pointing end side of a longitudinally extending section, has an opening through which a tailgate hinge, which is fastened in the hollow profile, protrudes, and wherein the end of the rear roof frame forms a tubular hollow profile of the lateral roof frame, which is connected to the hollow profile.

2. The roof frame as claimed in claim 1, wherein the hollow profile is divided into a component which runs rectilinearly and into the knee which is connected to the component which runs rectilinearly.

3. The roof frame as claimed in claim 1, wherein the hollow profile which leads from the transition region to the lateral roof frame and the tubular hollow profile are connected integrally to each other.

4. The roof frame as claimed in claim 1, wherein at least one of the hollow profile which leads from the transition region to the lateral roof frame and the tubular hollow profile is a component formed by internal high pressure.

5. The roof frame as claimed in claim 1, and further comprising a gas-filled compression spring arranged in the tubular hollow profile as a supporting device for the tailgate.

6. The roof frame as claimed in claim 1, wherein the knee is a hollow knee with an opening and is fastened with an end pointing in the front-end direction of the vehicle to a longitudinal side of the shell structure, and wherein the shell structure has an opening which is aligned with the opening of the hollow knee.

7. The roof frame as claimed in claim 1, wherein the tubular hollow profile has, on a side which faces the hollow profile which leads from the transition region to the lateral roof frame, a notch, wherein edges of the notch are encompassed in an overlapping manner by the hollow profile which leads from the transition region to the lateral roof frame, which is notch-free, and wherein the hollow profiles are at least one of welded and bonded to each other in an overlapping zone.

8. The rear roof frame as claimed in claim 1, wherein the hollow profile which leads from the transition region to the lateral roof frame is one of two such hollow profiles.

9. The roof frame as claimed in claim 2, wherein at least one of the hollow profile which leads from the transition region to the lateral roof frame and the tubular hollow profile is a component formed by internal high pressure.

10. The roof frame as claimed in claim 3, wherein at least one of the hollow profile which leads from the transition region to the lateral roof frame and the tubular hollow profile is a component formed by internal high pressure.

11. The roof frame as claimed in claim 2, and further comprising a gas-filled compression spring arranged in the tubular hollow profile as a supporting device for the tailgate.

12. The roof frame as claimed in claim 3, and further comprising a gas-filled compression spring arranged in the tubular hollow profile as a supporting device for the tailgate.

13. The roof frame as claimed in claim 4, and further comprising a gas-filled compression spring arranged in the tubular hollow profile as a supporting device for the tailgate.

14. The roof frame as claimed in claim 2, wherein the knee is a hollow knee with an opening and is fastened with an end pointing in the front-end direction of the vehicle to a longitudinal side of the shell structure, and wherein the shell structure has an opening which is aligned with the opening of the hollow knee.

15. The roof frame as claimed in claim 3, wherein the knee is a hollow knee with an opening and is fastened with an end pointing in the front-end direction of the vehicle to a longitudinal side of the shell structure, and wherein the shell structure has an opening which is aligned with the opening of the hollow knee.

16. The roof frame as claimed in claim 4, wherein the knee is a hollow knee with an opening and is fastened with an end pointing in the front-end direction of the vehicle to a longitudinal side of the shell structure, and wherein the shell structure has an opening which is aligned with the opening of the hollow knee.

17. The roof frame as claimed in claim 5, wherein the knee is a hollow knee with an opening and is fastened with an end pointing in the front-end direction of the vehicle to a longitudinal side of the shell structure, and wherein the shell structure has an opening which is aligned with the opening of the hollow knee.

18. The roof frame as claimed in claim 2, wherein the tubular hollow profile has, on a side which faces the hollow profile which leads from the transition region to the lateral roof frame, a notch, wherein edges of the notch are encompassed in an overlapping manner by the hollow profile which leads from the transition region to the lateral roof frame, which is notch-free, and wherein the hollow profiles are at least one of welded and bonded to each other in an overlapping zone.

19. The roof frame as claimed in claim 4, wherein the tubular hollow profile has, on a side which faces the hollow profile which leads from the transition region to the lateral roof frame, a notch, wherein edges of the notch are encompassed in an overlapping manner by the hollow profile which leads from the transition region to the lateral roof frame, which is notch-free, and wherein the hollow profiles are at least one of welded and bonded to each other in an overlapping zone.

20. The roof frame as claimed in claim 5, wherein the tubular hollow profile has, on a side which faces the hollow profile which leads from the transition region to the lateral roof frame, a notch, wherein edges of the notch are encompassed in an overlapping manner by the hollow profile which leads from the transition region to the lateral roof frame, which is notch-free, and wherein the hollow profiles are at least one of welded and bonded to each other in an overlapping zone.

21. The roof frame as claimed in claim 6, wherein the tubular hollow profile has, on a side which faces the hollow profile which leads from the transition region to the lateral roof frame, a notch, wherein edges of the notch are encompassed in an overlapping manner by the hollow profile which leads from the transition region to the lateral roof frame, which is notch-free, and wherein the hollow profiles are at least one of welded and bonded to each other in an overlapping zone.

* * * * *